United States Patent
Ben-Zvi et al.

(10) Patent No.: US 10,846,434 B1
(45) Date of Patent: Nov. 24, 2020

(54) COMPUTER-IMPLEMENTED FRAUD DETECTION

(71) Applicant: MASSACHUSETTS MUTUAL LIFE INSURANCE COMPANY, Springfield, MA (US)

(72) Inventors: Yaron Ben-Zvi, Hastings of Hudson, NY (US); Sears Merritt, Groton, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 518 days.

(21) Appl. No.: 15/357,697

(22) Filed: Nov. 21, 2016

Related U.S. Application Data

(60) Provisional application No. 62/260,065, filed on Nov. 25, 2015.

(51) Int. Cl.
  *G06F 21/62* (2013.01)
  *G06Q 50/00* (2012.01)

(52) U.S. Cl.
  CPC ........... *G06F 21/629* (2013.01); *G06Q 50/01* (2013.01)

(58) Field of Classification Search
  CPC ..... G06F 21/629; G06F 21/316; G06Q 50/01; H04L 43/0823; H04L 67/42; H04L 67/306; H04W 12/12
  See application file for complete search history.

(56) References Cited

U.S. PATENT DOCUMENTS

| 10,013,721 B1 * | 7/2018 | Laaser ................. G06Q 40/123 |
| 2007/0239604 A1 * | 10/2007 | O'Connell ......... G06Q 20/4016 705/50 |
| 2007/0255818 A1 * | 11/2007 | Tanzer .................. G06F 21/552 709/224 |
| 2008/0162202 A1 * | 7/2008 | Khanna .................. G06Q 20/10 705/14.47 |
| 2008/0288382 A1 * | 11/2008 | Smith .................... G06Q 40/00 705/35 |

(Continued)

FOREIGN PATENT DOCUMENTS

WO  WO-0067173 A1 * 11/2000 ............. G06Q 30/04

OTHER PUBLICATIONS

R. Moskovitch et al., "Identity theft, computers and behavioral biometrics," 2009 IEEE International Conference on Intelligence and Security Informatics, Dallas, TX, 2009, pp. 155-160. (Year: 2009).*

(Continued)

*Primary Examiner* — Hamza N Algibhah
*Assistant Examiner* — James Ross Hollister
(74) *Attorney, Agent, or Firm* — Foley & Lardner LLP

(57) ABSTRACT

Disclosed method comprises generating a fraud detection model comprising an algorithm to determine a likelihood of fraud for a client response based on data from similar customers responding to similar questions and data generated from tracking the client computing device. In response to the likelihood of fraud satisfying a threshold, the method comprises querying and displaying an electronic profile of the client, and inquiring the client as to whether the client is willing to modify any of the responses while monitoring the client device. The method comprises transmitting a fraud value to the customer database, in response to receiving the same input, form the client computing device.

20 Claims, 7 Drawing Sheets

(56) References Cited

U.S. PATENT DOCUMENTS

| | | | | |
|---|---|---|---|---|
| 2009/0192957 | A1* | 7/2009 | Subramanian | G06Q 10/04 706/21 |
| 2010/0094767 | A1* | 4/2010 | Miltonberger | G06Q 10/067 705/325 |
| 2010/0293090 | A1* | 11/2010 | Domenikos | G06Q 10/04 705/38 |
| 2011/0282695 | A1* | 11/2011 | Blue | G06F 19/328 705/4 |
| 2012/0204257 | A1* | 8/2012 | O'Connell | G06F 21/55 726/19 |
| 2012/0278246 | A1* | 11/2012 | Boding | G06Q 10/10 705/317 |
| 2013/0185189 | A1* | 7/2013 | Stewart | G06Q 40/02 705/38 |
| 2013/0185802 | A1* | 7/2013 | Tibeica | H04L 63/1483 726/26 |
| 2013/0339186 | A1* | 12/2013 | French | G06F 21/577 705/26.35 |
| 2014/0081652 | A1* | 3/2014 | Klindworth | G06Q 10/10 705/2 |
| 2015/0206214 | A1* | 7/2015 | Adjaoute | G06Q 20/4016 705/26.35 |
| 2015/0363791 | A1* | 12/2015 | Raz | G06Q 30/0185 705/318 |
| 2016/0005050 | A1* | 1/2016 | Teman | G06F 16/583 705/317 |
| 2016/0188819 | A1* | 6/2016 | Subramanian | G06F 19/328 705/4 |
| 2016/0328572 | A1* | 11/2016 | Valacich | A61B 5/7475 |
| 2017/0085587 | A1* | 3/2017 | Turgeman | G06F 3/03547 |

OTHER PUBLICATIONS

N. M. Gunathilake et al., "Enhancing the security of online banking systems via keystroke dynamics," 2013 8th International Conference on Computer Science & Education, Colombo, 2013, pp. 561-566. (Year: 2013).*

Jensen et al.,"Proceedings of the Rapid Screening Technologies, Deception Detection and Credibility Assessment Symposium" Jan. 2013 (Year: 2013).*

* cited by examiner

700

702
704
706

ACCOUNT NUMBER: 123-45-6789

GENDER: Item B ▶

OCCUPATION: Item C ▶ ← | Item A | Item B | Item C →

SUBMIT

FIG. 7

COMPUTER-IMPLEMENTED FRAUD DETECTION

CROSS-REFERENCE TO RELATED APPLICATION

This application claims priority to U.S. Provisional Patent Application Ser. No. 62/260,065, filed on Nov. 25, 2015, which is hereby incorporated by reference in its entirety.

FIELD OF DISCLOSURE

Generally, the present disclosure relates to computing. More particularly, the present disclosure relates to computerized model building and application thereof.

BACKGROUND

As the processing power of computers allow for greater computer functionality and the Internet technology era allows for interconnectivity between computing systems, many customers access online resources to provide their information. As a result, many institutions heavily rely on data gathered through online means to create customer profiles, anticipate customer needs, and provide services to customers. Numerous software solutions provide a method for institutions to provide questionnaires to their respective customers. However, since the implementation of these more sophisticated online tools and software solutions, several shortcomings in these technologies have been identified and have created a new set of challenges. For example, a customer's information may be incomplete, inaccurate or fraudulent due to a service disruption, network failure, or a computer security system compromise. Conventional software solutions focus on data encryption or other transmission security methods in order to increase the security, however, these methods require a large amount of resources/computing power and may still be compromised. As a result, institutions and software solutions that utilize existing and conventional methods do not provide an efficient method to combat or identify fraudulent data entry.

Furthermore, existing and conventional methods fail to independently verify customer information due to a high volume of customer information existing on different networks and computing infrastructures. Managing such information on different platforms, using conventional methods, has proven to be difficult, inaccurate, time-consuming, and arduous due to number, size, content, or relationships of the structured and/or unstructured data associated with the customer.

SUMMARY

For the aforementioned reasons, there is a need for a system and a method for processing large data entry datasets, which would allow institutions to ensure that the data received has not been compromised in a more efficient manner than possible with human-intervention data-driven analysis. There is a need for a network and computer-specific solution to increase the level of data security. These features allow performing large work such as time-consuming customer information verifications and analysis, in a more efficient manner than other approaches including manual work performed by humans or other conventional software solution.

In an embodiment, a method comprises generating, by a server, a first network page comprising a plurality of input fields configured to receive a plurality of inputs. The method comprises generating, by the server, a first instruction to monitor an input device associated with a client computing device. The method comprises, upon transmitting the first network page and the first instruction to the client computing device, receiving, by the server, a plurality of inputs corresponding to the plurality of input fields and data associated with monitoring the input device. The method comprises determining, by the server, one or more client attributes associated with the plurality of inputs. The method comprises determining, by the server, a likelihood of fraud based on a fraud detection model, wherein the fraud detection model comprises received data from a customer database for customers with same one or more client attributes, corresponding inputs to same input fields, and the data associated with monitoring the input device, whereby an algorithm identifies the likelihood of fraud based at least on one of received data from a customer database, corresponding inputs to same input fields, and data associated with monitoring the input device. The method comprises, in response to the likelihood of fraud satisfying a threshold, generating, by the server, a second instruction configured to receive an electronic profile associated with the client operating the client computing device. The method comprises upon transmitting the second instruction to a second database associated with the client, receiving, by the server, the electronic profile associated with the client. The method comprises generating, by the server, a second network page configured to display the electronic profile associated with the client and a notification inquiring whether the client is willing to modify any of the plurality of inputs corresponding to the plurality of input fields within the first network page. The method comprises transmitting, by the server, the second network page to the client computing device. The method further comprises, in response to receiving an input consistent with the plurality of inputs, transmitting, by the server, a fraud value to the customer database.

In another embodiment, a computer system comprises a server, which is configured to generate a first network page comprising a plurality of input fields configured to receive a plurality of inputs. The server is configured to generate a first instruction to monitor an input device associated with a client computing device. The server is configured to, upon transmitting the first network page and the first instruction to the client computing device, receive a plurality of inputs corresponding to the plurality of input fields and data associated with monitoring the input device. The server is configured to determine one or more client attributes associated with the plurality of inputs. The server is configured to determine a likelihood of fraud based on a fraud detection model, wherein the fraud detection model comprises received data from a customer database for customers with same one or more client attributes, corresponding inputs to same input fields, and the data associated with monitoring the input device, whereby an algorithm identifies the likelihood of fraud based at least on one of received data from a customer database, corresponding inputs to same input fields, and data associated with monitoring the input device. The server is configured to, in response to the likelihood of fraud satisfying a threshold, generate a second instruction configured to receive an electronic profile associated with the client operating the client computing device. The server is configured to, upon transmitting the second instruction to a second database associated with the client, receive the electronic profile associated with the client. The server is configured to generate a second network page configured to display the electronic profile associated with the client and a notification inquiring whether the client is willing to modify any of the plurality of inputs corresponding to the plurality of input fields within the first network page. The server is configured to transmit the second network page to the client computing device. The server is further configured to, in response to receiving an input consistent with the plurality of inputs, transmit a fraud value to the customer database.

Additional features and advantages of various embodiments are set forth in the description which follows, and in part is apparent from the description. Various objectives and other advantages of the present disclosure are realized and attained by various structures particularly pointed out in the exemplary embodiments in the written description and claims hereof as well as the appended drawings. It is to be understood that both the foregoing general description and the following detailed description are exemplary and explanatory and are intended to provide further explanation of the present disclosure as claimed.

BRIEF DESCRIPTION OF DRAWINGS

The accompanying drawings constitute a part of this specification and illustrate an embodiment of the present disclosure and together with the specification, explain the present disclosure.

FIG. 7 shows a graphical user interface page configured to receive a user input, in accordance to an embodiment of the present disclosure.

DETAILED DESCRIPTION

Figure 1:
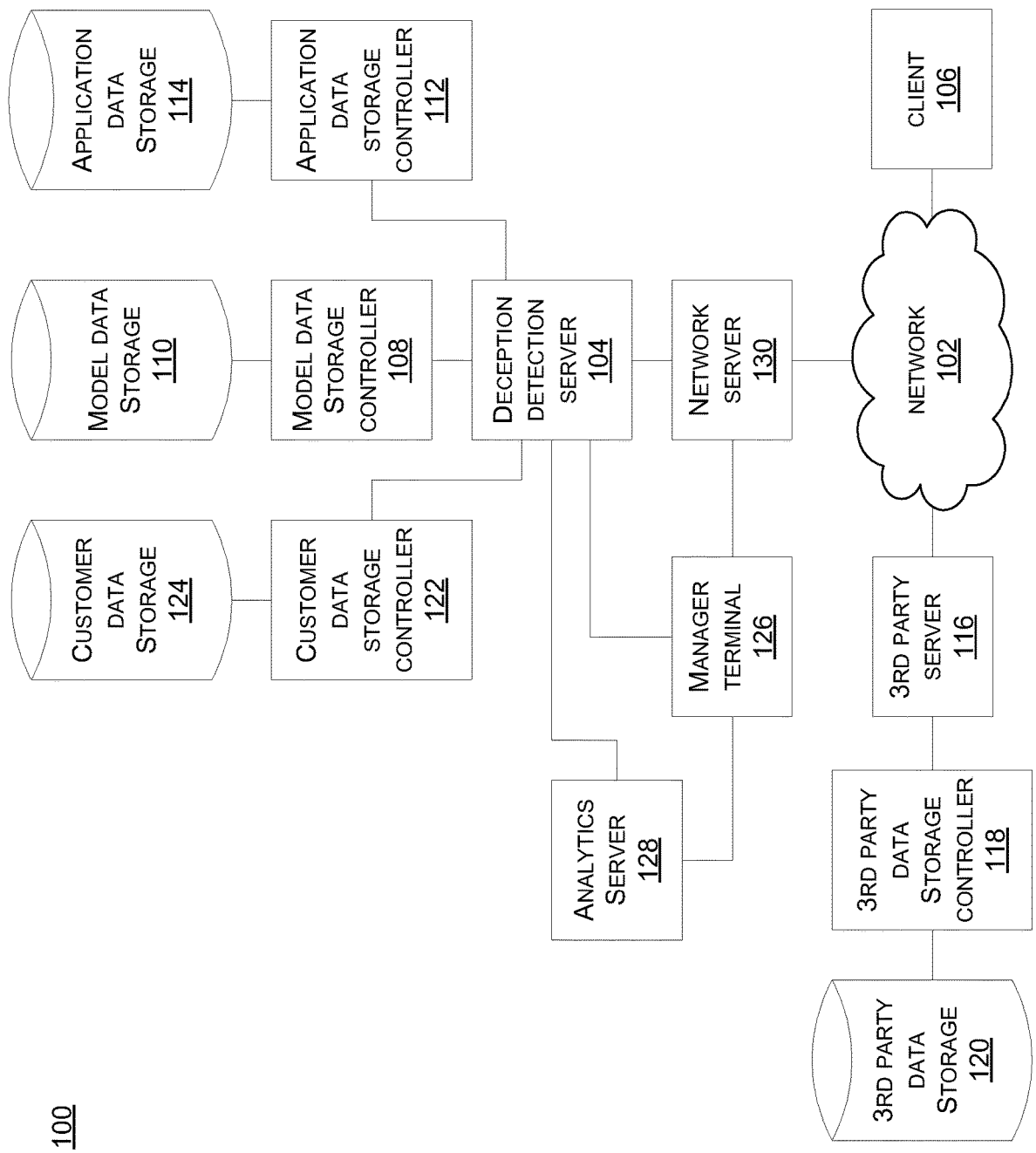
FIG. 1 shows a schematic view of an example embodiment of a network topology, in accordance to an embodiment of the present disclosure.

The present disclosure is now described more fully with reference to the accompanying drawings, in which example embodiments of the present disclosure are shown. The present disclosure may, however, be embodied in many different forms and should not be construed as necessarily being limited to the example embodiments disclosed herein. Rather, these example embodiments are provided so that the present disclosure is thorough and complete, and fully conveys the concepts of the present disclosure to those skilled in the relevant art.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

In some embodiments, a computer system is configured to enable an application of a first set of user data to a first model until a preset threshold is met. Subsequently, a second model is generated based on a result of the application when the threshold is exceeded. A second set of user data is then applied to the second model and a deviation from the second model may be determined. Based on such determination, the second user input is cross-referenced against a 3rd party service and a user is prompted to potentially amend the second set of user data. The first set of user data or the second set of user data is input through a set of control elements of a graphical user interface (GUI). An input device of the user is monitored throughout such process and data which conflicts or is inconsistent with the 3rd party service is flagged for further review or directed to an appropriate channel.

FIG. 1 shows a schematic view of an example embodiment of a network topology 100, in accordance to an embodiment of the present disclosure. A network topology 100 comprises a network 102, a deception detection server 104, a client 106, a model data storage controller 108, a model data storage 110, an application data storage controller 112, an application data storage 114, a 3rd party server 116, a 3rd party data storage controller 118, a 3rd party data storage 120, a customer data storage controller 122, a customer data storage 124, a manager terminal 126, an analytics server 128, and a network server 130. All components of the topology 100 can be coupled directly or indirectly, in a wired or a wireless manner, such as shown in FIG. 1. Note that each of components of the topology 100 can be implemented in logic, whether hardware-based or software-based. For example, when the logic is hardware-based, then such logic can comprise circuitry, such as processors, memory, input devices, output devices, or other hardware, that is configured, such as via programming or design, to implement a functionality of a respective component. Likewise, when the logic is software-based, then such logic can comprise one or more instructions, such as assembly code, machine code, object code, source code, or any other type of instructions, which when executed, such as via running or compilation, implement a functionality of a respective component. Further, note that at least one of such components can be implemented as a service. Moreover, note that at least two of such components can be hosted on one computing system/hardware/device or each be distinctly hosted.

The topology 100 is based on a distributed network operation model which allocates tasks/workloads between servers, which provide a resource/service, and clients, which request the resource/service. The servers and the clients illustrate different computers/applications, but in some embodiments, the servers and the clients reside in or are one system/application. Further, in some embodiments, the topology 100 entails allocating a large number of resources to a small number of computers, such as the servers, where complexity of the clients depends on how much computation is offloaded to the number of computers, i.e., more computation offloaded from the clients onto the servers leads to lighter clients, such as being more reliant on network sources and less reliant on local computing resources. Note that other computing models are possible as well. For example, such models can comprise decentralized computing, such as peer-to-peer (P2P), for instance Bit-Torrent®, or distributed computing, such as via a computer cluster where a set of networked computers works together such that the computer can be viewed as a single system.

The network 102 includes a plurality of nodes, such as a collection of computers and/or other hardware interconnected via a plurality of communication channels, which allow for sharing of resources and/or information. Such interconnection can be direct and/or indirect. The network 102 can be wired and/or wireless. The network 102 can allow for communication over short and/or long distances, whether encrypted and/or unencrypted. The network 102 can operate via at least one network protocol, such as Ethernet, a Transmission Control Protocol (TCP)/Internet Protocol (IP), and so forth. The network 102 can have any scale, such as a personal area network, a local area network, a home area network, a storage area network, a campus area network, a backbone network, a metropolitan area network, a wide area network, an enterprise private network, a virtual private network, a virtual network, a satellite network, a computer cloud network, an internetwork, a cellular network, and so forth. The network 102 can be and/or include an intranet and/or an extranet. The network 102 can be and/or include Internet. The network 102 can include other networks and/or allow for communication with other networks, whether sub-networks and/or distinct networks, whether identical and/or different from the network 102 in structure or operation. The network 102 can include hardware, such as a computer, a network interface card, a repeater, a hub, a bridge, a switch, an extender, an antenna, and/or a firewall, whether hardware based and/or software based. The network 102 can be operated, directly and/or indirectly, by and/or on behalf of one and/or more entities or actors, irrespective of any relation to contents of the present disclosure.

At least one of the server 104, the server 116, the server 128, or the server 130 can be hardware-based and/or software-based. At least one of the server 104, the server 116, the server 128, or the server 130 is and/or is hosted on, whether directly and/or indirectly, a server computer, whether stationary or mobile, such as a kiosk, a workstation, a vehicle, whether land, marine, or aerial, a desktop, a laptop, a tablet, a mobile phone, a mainframe, a supercomputer, a server farm, and so forth. The server computer can include and/or be a part of another computer system and/or a cloud computing network. The server computer can run any type of operating system (OS), such as MacOS®, Windows®, Android®, Unix®, Linux® and/or others. The server computer can include and/or be coupled to, whether directly and/or indirectly, an input device, such as a mouse, a keyboard, a camera, whether forward-facing and/or back-facing, an accelerometer, a touchscreen, a biometric reader, a clicker, and/or a microphone. The server computer can include and/or be coupled to, whether directly and/or indirectly, an output device, such as a display, a speaker, a headphone, a joystick, a videogame controller, and/or a printer. In some embodiments, the input device and the output device can be embodied in one unit, such as a touch-enabled display, which can be haptic. The server computer can include circuitry for geolocation/global positioning determination, such as via a global positioning system (GPS), a signal triangulation system, and so forth. The server computer can be equipped with near-field-communication (NFC) circuitry. The server computer can host, run, and/or be coupled to, whether directly and/or indirectly, a database, such as a relational database or a non-relational database, such as a post-relational database, an in-memory database, or others, which can feed, avail, or otherwise provide data to at least one of the server 104, the server 116, the server 128, or the server 130, whether directly and/or indirectly. Note that at least two of the server 104, the server 116, the server 128, or the server 130 can be identical to or different from each other in at least one of structure, programming, operation, location, or function. Note that at least two of the server 104, the server 116, the server 128, or the server 130 can be embodied or functioning as one unit.

At least one of the server 104, the server 116, the server 128, or the server 130, via the server computer, can be in communication with the network 102, such as directly and/or indirectly, selectively and/or unselectively, encrypted and/or unencrypted, wired and/or wireless. Such communication can be via a software application, a software module, a mobile app, a browser, a browser extension, an OS, and/or any combination thereof. For example, such communication can be via a common framework/application programming interface (API), such as Hypertext Transfer Protocol Secure (HTTPS).

The client 106 can be hardware-based and/or software-based. The client 106 is and/or is hosted on, whether directly and/or indirectly, a client computer, whether stationary or mobile, such as a terminal, a kiosk, a workstation, a vehicle, whether land, marine, or aerial, a desktop, a laptop, a tablet, a mobile phone, a mainframe, a supercomputer, a server farm, and so forth. The client computer can include and/or be a part of another computer system and/or cloud computing network. The client computer can run any type of OS, such as MacOS®, Windows®, Android®, Unix®, Linux® and/or others. The client computer can include and/or be coupled to an input device, such as a mouse, a keyboard, a camera, whether forward-facing and/or back-facing, an accelerometer, a touchscreen, a biometric reader, a clicker, and/or a microphone, and/or an output device, such as a display, a speaker, a headphone, a joystick, a videogame controller, and/or a printer. In some embodiments, the input device and the output device can be embodied in one unit, such as a touch-enabled display, which can be haptic. The client computer can include circuitry for geolocation/global positioning determination, such as via a GPS, a signal triangulation system, and so forth. The client computer can be equipped with NFC circuitry. The client computer can host, run and/or be coupled to, whether directly and/or indirectly, a database, such as a relational database or a non-relational database, such as a post-relational database, an in-memory database, or others, which can feed or otherwise provide data to the client 106, whether directly and/or indirectly. More than one client 106 can be used.

The client 106, via the client computer, is in communication with network 102, such as directly and/or indirectly, selectively and/or unselectively, encrypted and/or unencrypted, wired and/or wireless, via contact and/or contactless. Such communication can be via a software application, a software module, a mobile app, a browser, a browser extension, an OS, and/or any combination thereof. For example, such communication can be via a common framework/API, such as HTTPS. In some embodiments, the server 104 and the client 106 can also directly communicate with each other, such as when hosted in one system or when in local proximity to each other, such as via a short range wireless communication protocol, such as infrared or Bluetooth®. Such direct communication can be selective and/or unselective, encrypted and/or unencrypted, wired and/or wireless, via contact and/or contactless. Since many of the client's 106 can initiate sessions with the server 104 relatively simultaneously, in some embodiments, the server 104 employs load-balancing technologies and/or failover technologies for operational efficiency, continuity, and/or redundancy.

The terminal 126 can include, be a part of, or is a client, such as the client 106. The terminal 126 comprises a computer with a plurality of input/output devices, such as a keyboard, a mouse, a speaker, a display, a printer, a camera, or others. For example, the terminal 126 can be a tablet computer or a workstation computer. The display can output a GUI configured to input or to output information, whether alphanumerical, symbolical, or graphical, to a manager, such as a data analyst. The input can include various management information for managing the topology 100 and the output can include various statuses of the topology 100. The terminal 126 is able to communicate with other components of the topology 100 for maintenance purposes, such as to program or adjust any server, controller, or storage in the topology 100. The GUI can also be configured to present other management or non-management information as well, such as a social network feed. The terminal 126 can be configured to print reports, such as in color or grayscale.

At least one of the controller 108, the controller 112, the controller 122, or the controller 118 can include, be a part of, or is a device which manages a disk drive or other storage, such as flash storage, and presents the disk drive as a logical unit for subsequent access, such as various data input/output (IO) operations, including reading, writing, editing, deleting, updating, searching, selecting, merging, or others. At least one of the controller 108, the controller 112, the controller 122, or the controller 118 can include a front-end side interface to interface with a host adapter of a server and a back-end side interface to interface with a controlled disk storage. The front-end side interface and the back-end side interface can use a common protocol or different protocols. Also, at least one of the controller 108, the controller 112, the controller 122, or the controller 118 can include, be a part of, or is an enterprise controller, which can comprise a physically independent enclosure, such as a disk array of a storage area network or a network-attached storage server. For example, at least one of the controller 108, the controller 112, the controller 122, or the controller 118 can include, be a part of, or is a redundant array of independent disks (RAID) controller. Note that at least two of the controller 108, the controller 112, the controller 122, or the controller 118 can be identical to or different from each other in at least one of structure, programming, operation, location, or function. In some embodiments, at least one of the controller 108, the controller 112, the controller 122, or the controller 118 can be lacking such that a storage can be directly accessed. In some embodiments, at least two of the controller 108, the controller 112, the controller 122, or the controller 118 can be one unit or operate as one unit. Note that at least one of the controller 108, the controller 112, the controller 122, or the controller 118 can be unitary with at least one of the server 104, the server 116, the server 128, or the server 130.

At least one of the storage 110, the storage 114, the storage 124, or the storage 120 can include, be a part of, or is a storage medium, such as at least one of a data repository, a data mart, or a data store. For example, the storage medium is a database, such as a relational database, a non-relational database, an in-memory database, or others, which can store data and allow access to such data to a storage controller, whether directly and/or indirectly, whether in a raw state, a formatted state, an organized stated, or any other accessible state. At least one of the storage 110, the storage 114, the storage 124, or the storage 120 can include, be a part of, or is any type of storage, such as primary storage, secondary storage, tertiary storage, off-line storage, volatile storage, non-volatile storage, semiconductor storage, magnetic storage, optical storage, flash storage, hard disk drive storage, floppy disk drive, magnetic tape, or other data storage medium. In some embodiments, at least two of the storage 110, the storage 114, the storage 124, or the storage 120 can be one unit or operate as one unit. Note that at least two of the storage 110, the storage 114, the storage 124, or the storage 120 can be identical to or different from each other in at least one of structure, programming, operation, location, or function. At least one of the storage 110, the storage 114, the storage 124, or the storage 120 is configured for various data I/O operations, including reading, writing, editing, deleting, updating, searching, selecting, merging, or others. Note that at least one of the storage 110, the storage 114, the storage 124, or the storage 120 can be unitary with at least one of the controller 108, the controller 112, the controller 122, or the controller 118. Note that at least one of the storage 110, the storage 114, the storage 124, or the storage 120 can be unitary with at least one of the server 104, the server 116, the server 128, or the server 130.

Figure 2:
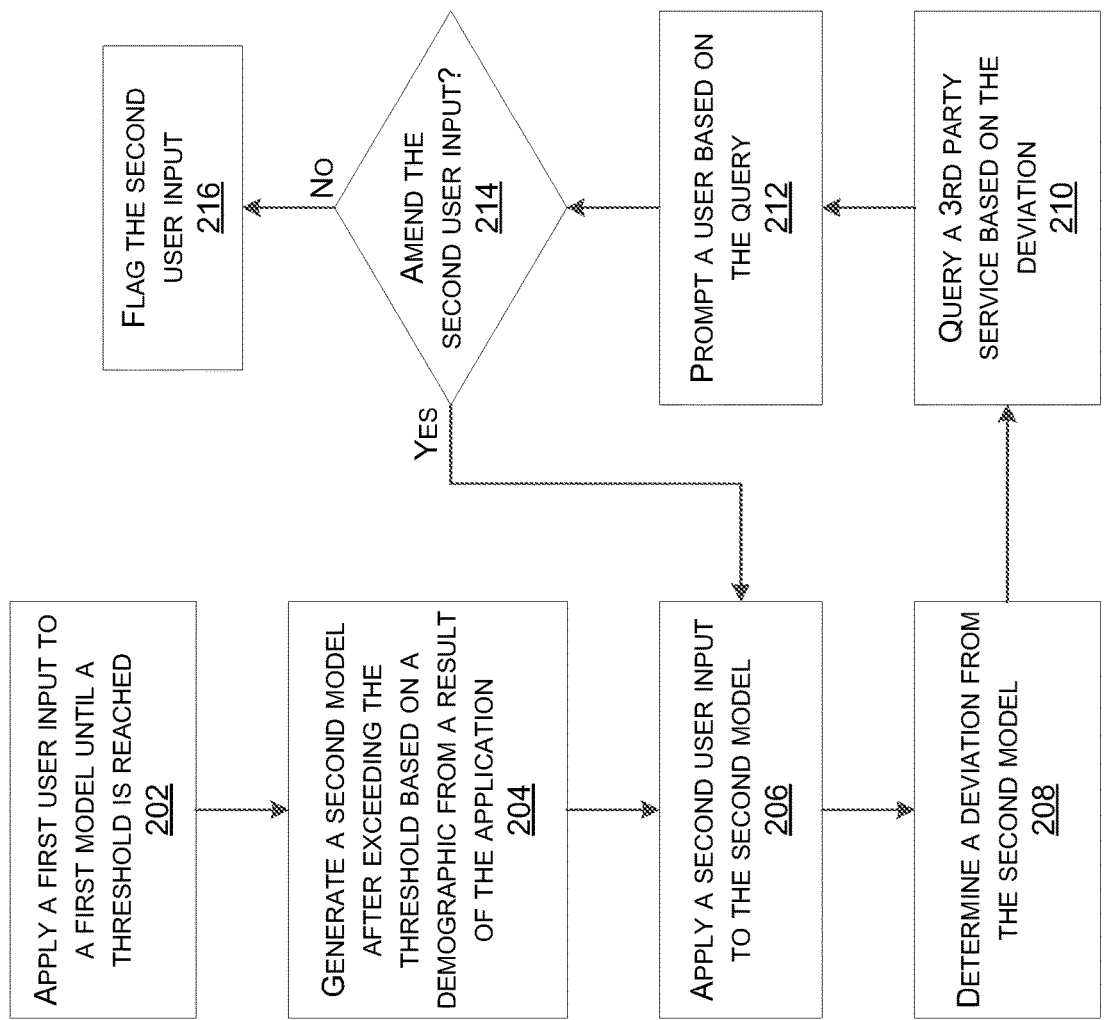
FIG. 2 shows a flowchart of an example embodiment of a process for misrepresentation detection, in accordance to an embodiment of the present disclosure.

FIG. 2 shows a flowchart 200 of an example embodiment of a process for misrepresentation detection, in accordance to an embodiment of the present disclosure. A flowchart/process 200 includes a plurality of blocks 202-216. The process 200 is at least partially performed using the topology 100 of FIG. 1.

In a block 202, a first user input is applied to a first model until a threshold is reached. The client 106 applies the first user input over the network 102 to the server 104 through the server 130 or directly to the server 104 thereby avoiding the server 130 or the network 102. The first user input includes at least one of symbolic, alphanumeric, graphical, audio, video, or any other type of data. The first user input can include an application information, such as name, age, gender, race, address, family information, education information, credit score information, occupation, health information, financial information, potential risk information, or any other relevant information, such as personal or demographic information. The first user input is for a single user or a plurality of users. The first user input can be stored in the storage 114 via the controller 112 by the server 104.

The first model is a probabilistic model, which models a probability of risk, such a health risk or a loss risk, for an entire population or a sub-set of the entire population. For example, the entire population can be an entire domestic population and the sub-set of the entire domestic population can be domestic males between age 21 and 55. For example, the first model can model a probability of cancer for domestic females between age 18 and 35. The first model can be obtained from a third party, generated from a publicly available information, generated from a current customer base, or otherwise available. For example, the first model can be a ground truth model. The first model is stored on the storage 110 via the controller 108 by the server 104. For example, the first model can be generated via the server 104 accessing current customer data from the storage 124 via the controller 122, generating the first model based on the current customer data, and storing the first model in the storage 110 via the controller 108. In operation, the first model may indicate a probability for a received input to be fraudulent. For example, a received input from a client computing device may indicate that the client, domestic male between age of 65 and 75, is not on any medication. In that example, the first model (e.g., the ground truth model) may use an algorithm and indicate, with a 75% accuracy, that the received input is inaccurate. In some embodiments, a threshold is identified and if the received input satisfies such threshold, server 104 may accept the received input as inaccurate. The threshold may be preset or may be determined by the client or another third-party server.

The first user input is applied to the first model as known to one of skilled in the art. For example, the first user input comprises an application information for an individual sent from the client 106 to the server 104, where the server 104 stores the application information in the storage 114 via the controller 112. The server 104 then accesses the first model in the storage 110 via the controller 108, applies the application information to the first model, and determines if the application information conforms to or consistent with the first model, such as being within a range of values of the first model. Such application is done automatically and can be performed in real-time as or responsive to the first user input being received. A result of the application of the first user input to the first model can be stored by the server 104 in the storage 114 via the controller 112.

The threshold comprises a value, a flag, or a variable input or set via the terminal 126 and sent to the server 104. The server 104 receives the threshold and stores the threshold in the storage 110 such that the threshold is related to or associated with the first model. The threshold is indicative of a maximum number of times, such as per a time period or per a session, that the first model will be applied to user inputs, whether from a single user or a plurality of users, whether consecutive or non-consecutive. Such amount can indicate a sufficient amount of data collected to generate sub-models, as described herein. The threshold can be reset. For example, the terminal 126 can receive a manager input corresponding to the threshold, where the manager input can be 10,000, which can be indicative of the first model being applied maximum to 10,000 inputs from 10,000 users.

In a block 204, a second model is generated after exceeding the threshold based on a demographic from a result of the application. When the server 104 applies the first user input to the first model, the server 104 accesses or keeps a count of such applications such that the count can be compared to the threshold to determine if the threshold is reached or exceeded. For example, when each of the first user input corresponds to a single application, then the count is incremented by a single value, such as if the counter is 459 after 459 applications of the first user input to the first model, then a next application of the first user input to the first model is 460 and the counter is accordingly incremented by 1 to 460. The counter can be a loop counter, such as a for loop. The count can be a value, a flag, or a variable stored in the storage 110 such that the count can be related to or associated with the first model or the threshold.

The second model is automatically generated by the server 104 as known to one of skilled in the art. For example, the second model can be generated via or based on a set of inputs, criteria, or ranges. The second model is a probabilistic model, which models a probability of risk, such a health risk or a loss risk, based on the result of the applications of the first user input to the first model as stored by the server 104 in the storage 114 via the controller 112. The second model is generated based on a demographic disclosed in the results of the applications of the first user input to the first model. For example, if the first model models a general population, the first user inputs were applied to the first model, and stored as results in the storage 114, then the server 104 accesses the results in the storage 114, generates a second model based on the results or the demographic from the results and stores the second model in the storage 110. The demographic can comprise health information, age information, gender information, race information, or other relevant information. The second model can be a sub-model of the first model. The second model can be generated based on data from the storage 124 as well or any other data. Upon generation, the second model is stored in the storage 110 via the controller 108 by the server 104.

In a block 206, a second user input is applied to a second model. The second user input is from the client 106 over the network 102 to the server 104 through the server 130 or directly to the server 104 thereby avoiding the server 130 or the network 102. The second user input includes at least one of symbolic, alphanumeric, graphical, audio, video, or any other type of data. The second user input can include application information, such as name, age, gender, race, address, family information, education information, credit score information, occupation, health information, financial information, potential risk information, or any other relevant information, such as personal or demographic information. The second user input is for a single user or a plurality of users. The second user input can be stored in the storage 114 via the controller 112 by the server 104. Although FIG. 1 depicts a single client 106, the present disclosure can comprise a plurality of clients 106, where each of the clients corresponds to a unique instance of user input, whether the first user input or the second user input. For example, first 10,000 applications for the first user input can be provided through 10,000 clients 106, whether unique or non-unique, whereas applications between 10,001 and 100,000 can be provided through other clients 106, whether unique or non-unique. In some embodiments, the server 104 may determine an attribute associated with the application (e.g., customers or clients producing the applications). For example, the server 104 may categorize all the customers by their age, sex, income, job, and other attributes a like.

The second user input is applied to the second model as known to one of skilled in the art. For example, the second user input comprises application information for an individual sent from the client 106 to the server 104, where the server 104 stores the application information in the storage 114 via the controller 112. The server 104 then accesses the second model in the storage 110 via the controller 108, applies the application information to the second model, and determines if the application information conforms to or consistent with the second model, such as being within a range of values of the second model. Such application is done automatically and can be performed in real-time as or responsive to the second user input being received. A result of the application of the second user input to the second model can be stored by the server 104 in the storage 114 via the controller 112.

In a block 208, a determination of a deviation from the second model occurs. The server 104 accesses the second model in the storage 110 and the result of the application of the second user input to the second model in the storage 114. The server 104 then determines if the result of the application of the second user input to the second model deviates from the second model. For example, if the second model models that a male between 21 and 35 should have X health issues and the result of the application of the second user input to the second model is indicative of a male applicant between 21 and 35 whose health information is inconsistent with X, then the deviation is determined, recorded, and stored in the storage 114. The deviation can be a flag for subsequent triggers of server 104 operation. In some embodiments the second model (e.g., the fraud detection model) may only be utilized if received input from the client computing device satisfies a threshold. For example, if the algorithm within the first model indicates that the received input from the client computing device is inaccurate, the second model may be used. In some embodiments, the server 104 may determine an attribute associated with the application (e.g., customers or clients producing the applications). For example, the server 104 may categorize all the customers by their age, sex, income, job, and other attributes a like. The fraud detection model may also compare the attribute of the customer, who is being evaluated, with other customers with the same attributers.

In a block 210, a 3rd party service is queried based on the deviation. The server 104, through the server 130 and the network 102, queries the server 116. The query contains information obtained from or contained in the second user input or in the result of the application of the second user input to the second model, whether related to or unrelated to the deviation. The query is about a user identified in the second user input or in the result of the application of the second user input to the second model. The server 116 can include, be a part of, or is a social network service, a pharmaceutical service, a medical service, an educational service, a financial service, an employment service, a governmental service, or any other relevant service. The server 116 requests data from the storage 120 via the controller 118 and sends the data retrieved from the storage 120 to the server 104 through the network 102 and the server 130. Note that the block 210 can be performed even if no deviation from the second model is determined.

In a block 212, a user is prompted based on the query. The user is associated with the second user input or the result of the application of the second user input to the second model and operates the client 106. The server 104 receives the queried data from the server 116 and prompts the client 106, through the server 130 over the network 102, based on the queried data. The prompt can be informative of or inquiring the user of a potential misrepresentation or an error in the second user input or in the result of the application of the second user input to the second model, whether related to or unrelated to the deviation. Note that the block 212 can be performed even if no deviation from the second model is determined.

In a block 214, the user is inquired as to whether the user wants to amend the second user input. The server 104 sends a message through the server 130 over the network 102 to the client 106, where the message asks if the user wants to amend or edit the second user input because a potential misrepresentation or an error in the second user input or the result of the application of the second user input to the second model has been detected via cross-referencing or cross-checking the second user input or the result of the application of the second user input to the second model at least through the 3rd party service via the server 116. If the user indicates a desire to amend the second user input, such via operating the GUI on the client 106, then the block 206 is performed. If the user indicates a desire not to amend the second user input, then a block 216 is performed. Note that the client 106 can be monitored during the block 214, such as to monitor an input device or an output device of the client 106, as described herein. Such monitoring can aid in a heuristic pattern recognition, which can reduce fraud or errors in the second user input or the result of the application of the second user input to the second model. For example, the heuristic pattern recognition can be based on a Bayesian approach to detect a misrepresentation or an error in the second user input or the result of the application of the second user input to the second model.

In the block 216, the second user input or the result of the application of the second user input to the second model is flagged by the server 104, even if the user amends the second user input. Such flag is stored in the storage 114 via the controller 112 by the server 104 and related to the second user input or the result of the application of the second user input to the second model. The flag can be helpful for further review or a direction of the user to an appropriate channel, such as an agent for a personal interview.

Figure 3:
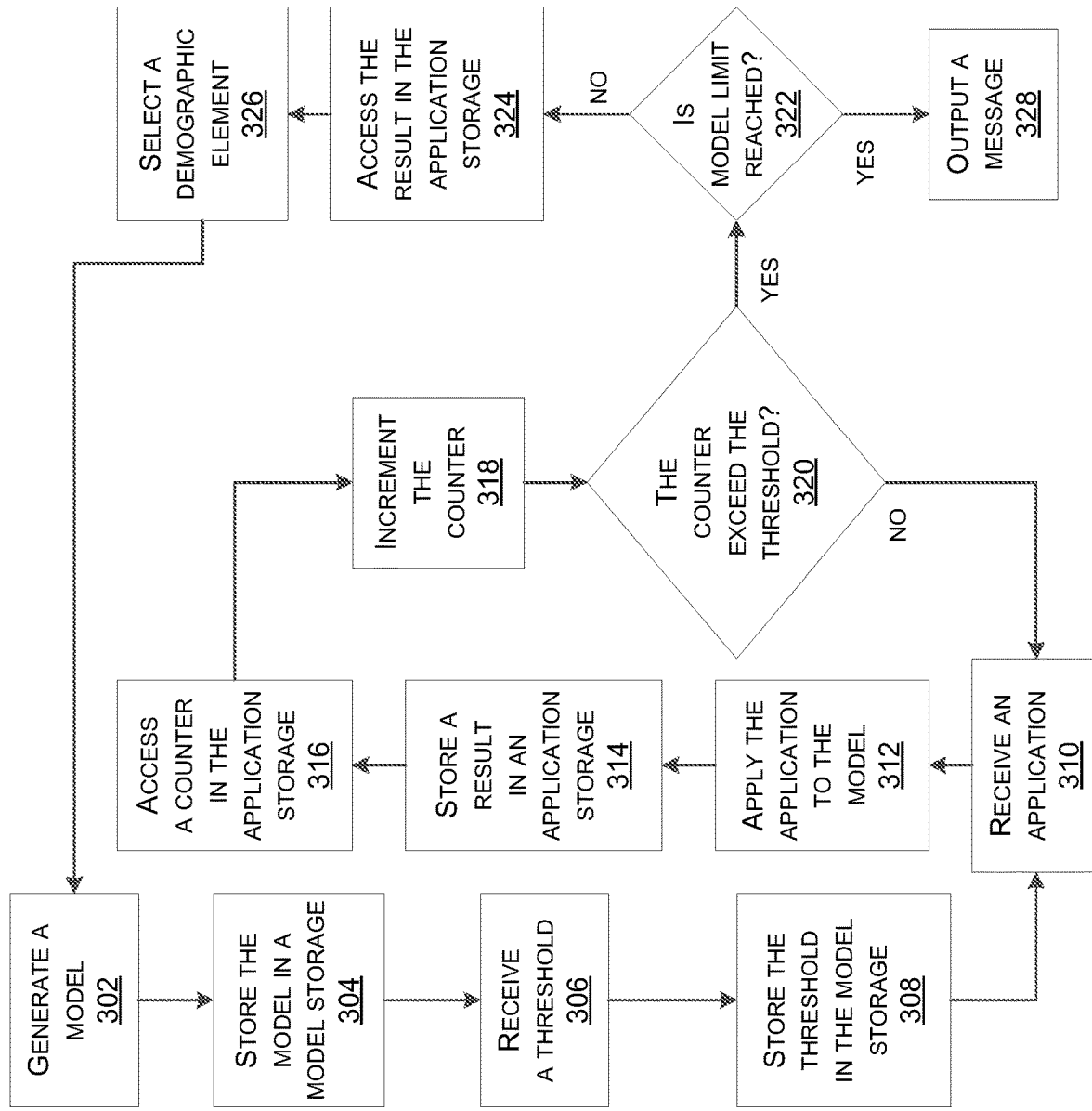
FIG. 3 shows a flowchart of an example embodiment of a process for model generation, in accordance to an embodiment of the present disclosure.

FIG. 3 shows a flowchart 300 of an example embodiment of a process for model generation according to the present disclosure. A flowchart/process 300 includes a plurality of blocks 302-328. The process 300 is at least partially performed using the topology 100 of FIG. 1 and in context of the process 200.

In block 302, the server 104 generates a model from publicly available information or current customer base, downloading a premade model from a 3rd party computer, retrieving a model from a storage, such as the storage 110, or otherwise accessing a model. The model is a probabilistic model, which models a probability of risk, such a health risk or a loss risk, for an entire population or a sub-set of the entire population. For example, the entire population can be an entire domestic population and the sub-set of the entire domestic population can be domestic males between age 21 and 55. For example, the model can model a probability of cancer for domestic females between age 18 and 35. For example, the model can be the first model of FIG. 2.

In a block 304, the server 104 stores the model in a model storage, such as in the storage 110 via the controller 108. For example, the first model can be generated via the server 104 accessing current customer data from the storage 124 via the controller 122, generating the first model based on the current customer data, and storing the first model in the storage 110 via the controller 108.

In a block 306, the server 104 receives a threshold from the terminal 126. The threshold comprises a value, a flag, or a variable input or set via the terminal 126 and sent to the server 104. The threshold is indicative of a maximum number of times, such as per a time period or per a session, that the model will be applied to user inputs, whether from a single user or a plurality of users, whether consecutive or non-consecutive. Such amount can indicate a sufficient amount of data collected to generate sub-models, as described herein. The threshold can be reset. For example, the terminal 126 can receive a manager input corresponding to the threshold, where the manager input can be 10,000, which can be indicative of the first model being applied maximum to 10,000 inputs from 10,000 users.

In a block 308, the server 104 stores the threshold in the model storage such that the threshold is related to or associated with the model.

In a block 310, the server 104 receives an application, such as a user input, for instance, a first user input. The application is from the client 106 over the network 102 to the server 104 through the server 130 or directly to the server 104 thereby avoiding the server 130 or the network 102. The application includes at least one of symbolic, alphanumeric, graphical, audio, video, or any other type of data. The application can include information, such as name, age, gender, race, address, family information, education information, credit score information, occupation, health information, financial information, potential risk information, or any other relevant information, such as personal or demographic information. The application is for a single user or a plurality of users. The application can be stored in the storage 114 via the controller 112 by the server 104.

In a block 312, the server 104 applies the application to the model. The application is applied to the model as known to one of skilled in the art. For example, the application comprises information for an individual sent from the client 106 to the server 104, where the server 104 stores the application information in the storage 114 via the controller 112. The server 104 then accesses the model in the storage 110 via the controller 108, applies the application information to the model, and determines if the application information conforms to or consistent with the model, such as being within a range of values of the model. Such application is done automatically and can be performed in real-time as or responsive to the user input being received.

In a block 314, the server 104 stores a result of the application of the user input to the model in the storage 114 via the controller 112.

In a block 316, the server 104 accesses a counter stored in the storage 110 via the controller 108. The counter is used to count each time the server 104 applies the user input to the model. The server 104 accesses or keeps the count of such applications such that the count can be compared to the threshold to determine if the threshold is reached or exceeded. The counter can be a loop counter, such as a count-controlled loop, a condition-controlled loop, a collection-controlled loop, a while loop, a for loop, or other successive sequence of computer statements. The count can be a value, a flag, or a variable stored in the storage 110 such that the count can be related to or associated with the model or the threshold.

In a block 318, the server 104 increments the counter 318. For example, when each of the user inputs corresponds to a single application, then the count is incremented by a single value by the server 104, such as if the counter is 2798 after 2798 applications of the user input to the model, then a next application of the user input to the model is 2799 and the counter is accordingly incremented by 1 to 2799.

In a block 320, the server 104 compares the counter to the threshold. If the counter does not exceed the threshold, then the block 310 is performed. If the counter exceeds the threshold, then a block 322 is performed. For example, if the threshold is 25,000 applications of the user input to the model and the counter is 4,000, then the block 310 is performed, which can indicate a presence of insufficient amount of data to generate another model based on the 4,000 applications, i.e., not enough meaningful statistical data to warrant a generation of another model, which can be a sub-model. However, if the counter is 25,001, then block 322 is performed, which can indicate a presence of sufficient amount of data to generate another model based on the 25,000 applications, i.e., enough meaningful statistical data to warrant a generation of another model, which can be a sub-model.

In the block 322, due to a potential recursive/iterational nature of the process 300, the server 104 checks if a model limit has been reached. The model limit can be set or input via the terminal 126 and sent to the server 104. Alternatively, the model limit can be sent to the storage 110 via the controller 108 and accessed by the server 104 via the controller 108. Alternatively, the model limit can be programmed into the server 104. The model limit can be any number, odd or even, such as 100 models or 2311 models maximum. Alternatively, the model limit can be based on total memory used to store the models, such as 1 gigabyte maximum or 25 terabytes maximum. Alternatively, the model limit can be automatically adjusted based on varying conditions of the topology 100, such as added storage, removed storage, added processing or networking capabilities, removed processing or networking capabilities, compaction of the models, editing the models, deleting the models, simplification of the models, or others. The model limit can be edited, amended, or reset, whether manually from the terminal 126 or automatically, such as based on a heuristic. The server 104 checks if the model limit has been reached by comparing the model limit against the storage 110, such as via accessing a model count for the models, a record count for the models, a memory count for the models, or any other limit comparison method. If the server 104 determines that the model limit has been reached, then a block 328 is performed. If the server 104 determines that the model limit has not been reached, the a block 324 is performed.

In the block 324, the server 104 accesses the result of the application of the model in the storage 114 via the controller 112.

In a block 326, the server 104 selects a demographic element disclosed in the result of the application of the model in the storage 114, whether explicitly or implicitly, such as via artificial intelligence or heuristic algorithms, for instance Bayesian. Alternatively, the demographic is selected based on the manager input into the terminal 126. The demographic can comprise health information, age information, gender information, race information, residence information, computer information, or other relevant information. Subsequently, the process 300 continues to the block 302. Resultantly, recursively/iteratively, the user input is applied to the model until the threshold is reached and another model is generated after exceeding the threshold based on the demographic from the result of the previous application of the user input to the model. For example, if the first model models a general population, the first user inputs were applied to the first model, and stored as results in the storage 114, then the server 104 accesses the results in the storage 114, generates a second model based on the results or the demographic from the results and stores the second model in the storage 110. The second model can be a sub-model of the first model. The second model can be generated based on data from the storage 124 as well or any other data. Upon generation, the second model is stored in the storage 110 via the controller 108 by the server 104.

Figure 4:
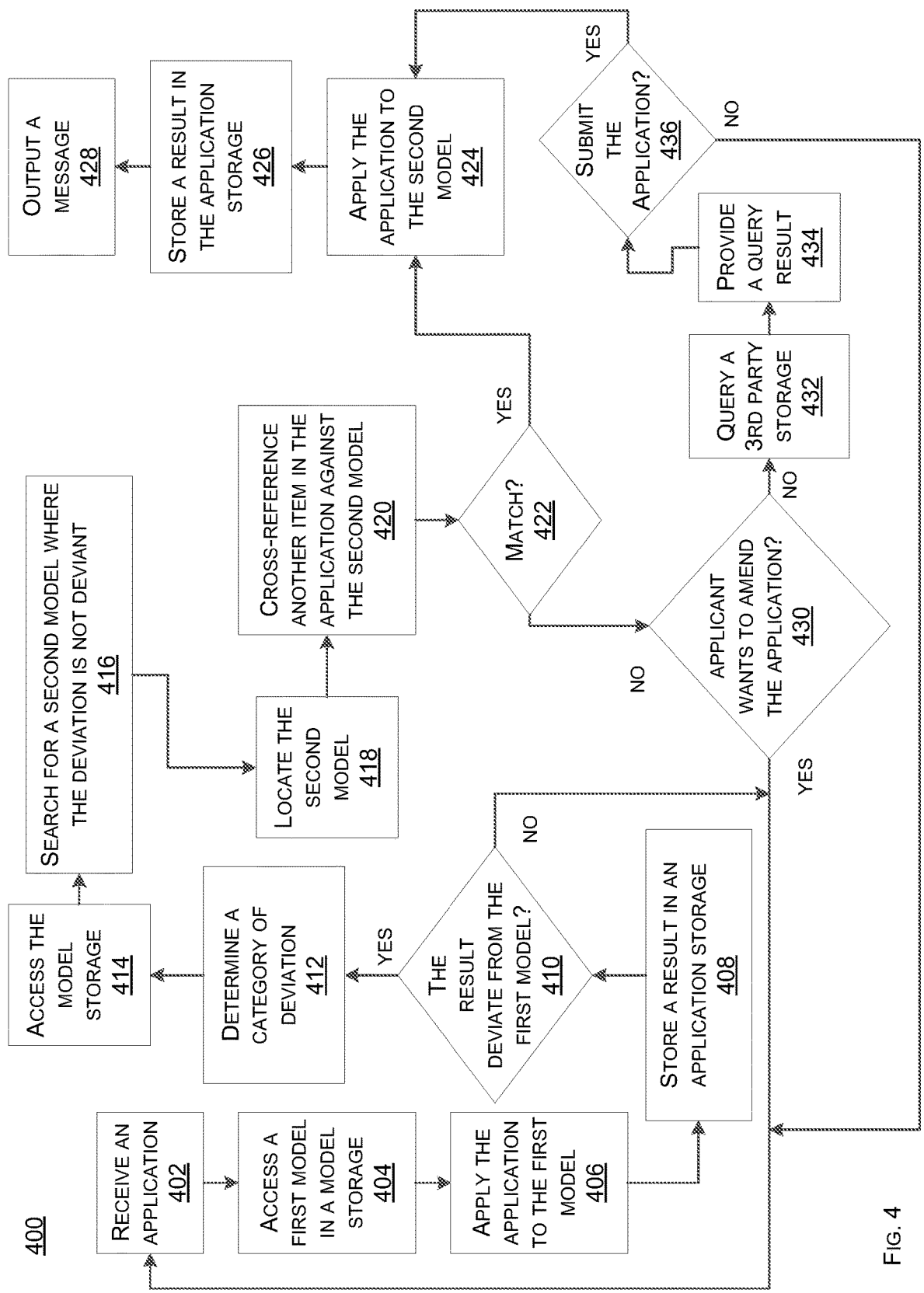
FIG. 4 shows a flowchart of an example embodiment of a process for model application, in accordance to an embodiment of the present disclosure.

FIG. 4 shows a flowchart of an example embodiment of a process 400 for model application according to the present disclosure. A process 400 includes a plurality of blocks 402-436. The process 400 is at least partially performed using the topology 100 of FIG. 1 and in context of the process 200 or 300.

In a block 402, the server 104 receives an application, such as a user input, for instance a first user input, from the client 106 over the network 102 through the server 130 or directly from the client 106 while avoiding the network 102 or the server 130. The client 106 is operated by an applicant. The application includes at least one of symbolic, alphanumeric, graphical, audio, video, or any other type of data. The application can include information, such as name, age, gender, race, address, family information, education information, credit score information, occupation, health information, financial information, potential risk information, or any other relevant information, such as personal or demographic information. The application is for a single user or a plurality of users. The application can be stored in the storage 114 via the controller 112 by the server 104.

In a block 404, the server 104 accesses a first model in a model storage, such as the storage 110. The first model can be obtained in various ways, such as via generating a model from publicly available information or current customer base or downloading a premade model from a 3rd party computer or otherwise accessing a model. The first model is a probabilistic model, which models a probability of risk, such a health risk or a loss risk, for an entire population or a sub-set of the entire population. For example, the entire population can be an entire domestic population and the sub-set of the entire domestic population can be domestic females between age 35 and 65. For example, the first model can model a probability of heart disease for domestic females between age 45 and 55. For example, the model can be the first model of FIG. 2.

In a block 406, the server 104 applies the application to the first model. The application is applied to the first model as known to one of skilled in the art. For example, the application comprises information for an individual sent from the client 106 to the server 104, where the server 104 stores the application information in the storage 114 via the controller 112. The server 104 then accesses the first model in the storage 110 via the controller 108, applies the application information to the first model, and determines if the application information conforms to or consistent with the first model, such as being within a range of values of the model. Such application is done automatically and can be performed in real-time as or responsive to the user input being received.

In a block 408, the server 104 stores a result of the application of the application to the first model in an application storage, such as the storage 114 via the controller 112.

In a block 410, the server 104 accesses the first model in the model storage and the result of the application of the application to the first model in the application storage to determine a presence of a deviation from the first model. The server 104 then determines if the result of the application of the application to the first model deviates from the first model. For example, if the first model models that a male between 21 and 35 should have X health issues and the result of the application of the application to the first model is indicative of a male applicant between 21 and 35 whose health information is inconsistent with X, then the deviation is determined, recorded, and stored in the storage 114. The deviation can be a flag for subsequent triggers of server 104 operation. If no deviation is determined, then the block 402 is performed, such as via recursion/iteration. If the deviation is determined, the a block 412 is performed.

In the block 412, the server 104 determines a category of the deviation in the result of the application of the application to the first model. For example, if the first model models that a male between 21 and 35 should have under 5 significant health issues and the result of the application of the application to the first model is indicative of a male applicant between 21 and 35 with 7 significant health issues, then the server 104 determines that the deviation is in a health issue category. Such information can be recorded by the server 104 into the storage 114 via the controller 112.

In a block 414, the server 104 access the model storage, such as the storage 110 via the controller 108.

In a block 416, the server 104 searches the model storage for a second model where the deviation is not deviant, such as via requesting a search operation through the controller 108. The search can be of any type, such as via a built-in search function, a fuzzy searching, or any other type of search. For example, if the first model models that a male between 21 and 35 should have under 5 significant health issues and the result of the application of the application to the first model is indicative of a male applicant between 21 and 35 with 7 significant health issues, then the server 104 determines that the deviation is in a health issue category and searches the model storage for any model where 7 significant health issues is within normal parameters, i.e., not deviant.

In a block 418, the server 104 locates the second model, such as where the deviation of the blocks 410-412 is considered within a normal range, i.e., not deviant.

In a block 420, the server 104 cross-references, such as via cross-checking, another item in the application against the second model. For example, the server 104 can cross-reference race or ethnicity as disclosed, whether explicitly or implicitly, in the application against the second model. Therefore, if the race or the ethnicity in the application match to a race or ethnicity in the second model, then there is a less likelihood of a misrepresentation or an error. Note that the cross-referencing can occur via accessing the storage 110 and the storage 114. Also, note that the cross-referencing of the item in the application against the second model is based on that item not being cross-referenced earlier. Also, note that the cross-referencing can also include cross-referencing the result against the second model, whether additionally or alternatively.

In a block 422, the server 104 determines if the cross-referencing was able to find a match. If yes, then a block 424 is performed. If not, then a block 430 is performed.

In the block 424, the server 104 applies the application to the second model. The application is applied to the second model as known to one of skilled in the art. For example, the application comprises information for an individual sent from the client 106 to the server 104, where the server 104 stores the application information in the storage 114 via the controller 112. The server 104 then accesses the second model in the storage 110 via the controller 108, applies the application information to the second model, and determines if the application information conforms to or consistent with the second model, such as being within a range of values of the second model. Such application is done automatically and can be performed in real-time as or responsive to the user input being received.

In a block 426, the server 104 stores a result of the application of the application to the second model in the application storage, such as the storage 114 via the controller 112.

In a block 428, the server 104 outputs a message based on such storage. The output can be of any type, such as symbolic, alphanumeric, video, audio, tactile, or any other type. The message is informative of the block 426. Note that any server of the topology 100 can act upon such message. For example, a deviation can be further searched for recursively/iteratively, as disclosed herein, such as via the process 400 continuing to the block 410.

In a block 430, the server 104 inquires if the applicant wants to amend the application. The applicant operating the client 106 is prompted as to whether the applicant wants to amend the application. Such inquiry is performed via the server 104 sending a message through the server 130 over the network 102 to the client 106, where the message asks if the applicant wants to amend or edit the application because a potential misrepresentation or an error in the application or the result of the application of the application to the second model has been detected via cross-referencing or cross-checking the application or the result of the application of the application to the second model. If the user indicates a desire to amend the application, such via operating the GUI on the client 106, then the block 402 is performed. If the user indicates a desire not to amend the second user input, then a block 432 is performed. Note that the client 106 can be monitored during the block 430, such as to monitor an input device or an output device of the client 106, as described herein. Such monitoring can aid in a heuristic pattern recognition, which can reduce fraud or errors in the application or the result of the application of the application to the second model. For example, the heuristic pattern recognition can be based on a Bayesian approach to detect a misrepresentation or an error in the application or the result of the application of the application to the second model.

In the block 432, a 3rd party service is queried. The server 104, through the server 130 and the network 102, queries the server 116. Alternatively, the server 104 queries the server 116 while avoiding the server 130 or the network 102. The query contains information obtained from or contained in the application or in the result of the application of the application to the second model. The query is about the applicant identified in the application or in the result of the application of the application to the second model. The server 116 can include, be a part of, or is a social network service, a pharmaceutical service, a medical service, an educational service, a financial service, an employment service, a governmental service, or any other relevant service. The server 116 requests data from the storage 120 via the controller 118 and sends the data retrieved from the storage 120 to the server 104 through the network 102 and the server 130 or directly while avoiding the network 102 or the server 130. Note that the block 432 can be performed even if the cross-referencing another item in the result against the second model of the block 420 is matched successfully in the block 422.

In a block 434, the applicant is provided with a query result based on the query. The applicant is associated with the application or the result of the application of the application to the second model and operates the client 106. The server 104 receives the queried data from the server 116 and prompts the client 106, through the server 130 over the network 102, based on the queried data. The prompt can be informative of or inquiring the user of a potential misrepresentation or an error in the application or in the result of the application of the application to the second model.

In a block 436, the server 104 inquires if the applicant wants to submit the application for further processing or amend the application. The applicant operating the client 106 is prompted as to whether the applicant wants to submit the application for further processing or amend the application. Such inquiry is performed via the server 104 sending a message through the server 130 over the network 102 to the client 106, where the message asks if the applicant wants to submit the application for further processing or amend or edit the application. If the applicant indicates a desire to amend the application, such via operating the GUI on the client 106, then the block 402 is performed. If the user indicates a desire not to amend the application and submit the application for further processing, then the block 424 is performed. Note that the client 106 can be monitored during the block 436, such as to monitor an input device or an output device of the client 106, as described herein. Such monitoring can aid in a heuristic pattern recognition, which can reduce fraud or errors in the application or the result of the application of the application to the second model. For example, the heuristic pattern recognition can be based on a Bayesian approach to detect a misrepresentation or an error in the application or the result of the application of the application to the second model. Note that the application or the result of the application of the application to the second model can be flagged by the server 104, even if the applicant amends the application. Such flag is stored in the storage 114 via the controller 112 by the server 104 and related to the application or the result of the application of the application to the second model. The flag can be helpful for further review or a direction of the user to an appropriate channel, such as an agent for a personal interview.

Figure 5:
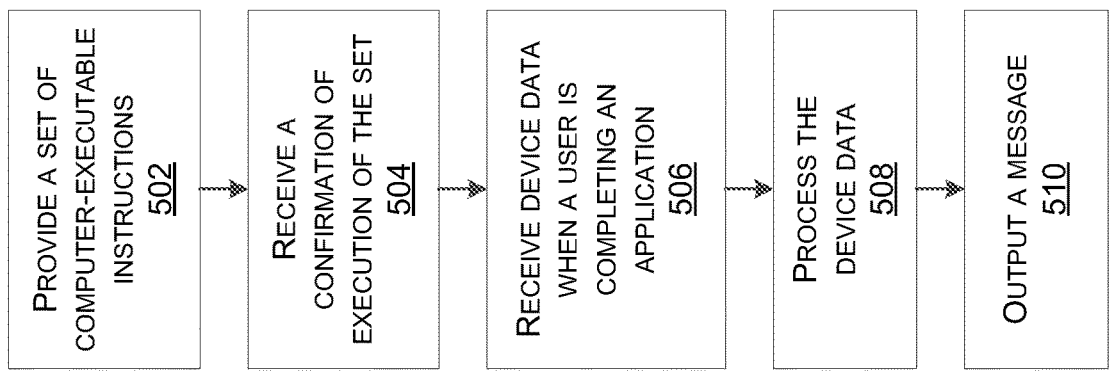
FIG. 5 shows a flowchart of an example embodiment of a process for user monitoring, in accordance to an embodiment of the present disclosure.

FIG. 5 shows a flowchart 500 of an example embodiment of a process for user monitoring according to the present disclosure. A flowchart/process 500 includes a plurality of blocks 502-510. The process 500 is at least partially performed using the topology 100 of FIG. 1 and in context of the process 200, 300, or 400.

In a block 502, the server 104 provides, such as via sending or availing, a set of computer-executable instructions, such as an executable file, to the client 106 through the server 130 over the network 102. Alternatively, the server 104 provides the set to the client 106 directly, while avoiding the server 130 or the network 102. The server 104 can access the set from a storage, as described herein. The set can be provided as a compressed file, such as an archived file. The set can also be provided as a module or as part of another software application or a browser extension or a mobile app or as a bundle with a plurality of software applications. Alternatively, the set can be embodied as a hardware unit, such as a circuit or a chip or a dongle or a drive.

The set provided by the server 104 instructs the computer to begin monitoring an aspect, a characteristic, a property, or a feature of an input device or an output device of the client 106. For example, the server 104 provides an executable file to the client 106, where, when the file is executed on the client 106, the file starting monitoring an aspect, a characteristic, a property, or a feature of an input device or an output device of the client 106, such as a keyboard, a mouse, a touchpad, a camera, a display, a speaker, a printer, an antenna, a network card, or any other input or output device of the client 106 or coupled to the client 106. For example, an aspect, a characteristic, a property, or a feature of an input device or an output device of the client 106 can comprise keyboard key pressing/key pressing frequency/patterns, mouse positioning/button frequency/patterns, touchpad tracking/pressing frequency/patterns, camera input, display output, speaker output, timing, or others. In some embodiments, the set can operate as a key logger or a mouse tracker or a screen capturer. In some embodiments, the set can monitor software running on the client 106, such as a file browser, a network browser, a messaging application, a mobile app, a productivity application, or any other software running on any abstraction layer. When executed, the set is configured to generate and send a message to the server 104, where the message informs of a successful installation. The message can be encrypted or unencrypted. Upon a receipt of such message, the server 104 can begin to listen for a receipt of monitoring information from the client 106, as provided via the set. In some embodiments, the set is provided or installed without a notification to a user of the client 106. In some embodiments, the set provided or installed with a notification to a user of the client 106, such as for privacy purposes.

In some embodiments, tracking and monitoring the client computing device may include a module for Real user monitoring (RUM). RUM is a monitoring technology, which records all client interactions with a website, server, or a cloud-based application. For example, RUM will record and flag client activity if the client is asked for a residential address and searches a website to obtain said address. In another example, RUM will track whether the client has changed the answers (e.g., whether client has requested to back and change certain answers). In some other embodiments, the server 104, or a module associated with the client computing device, may be configured to track client's mouse activity.

In a block 504, the server 104 receives a confirmation of the execution of the set from the client over the network 102 through the server 130 or directly, while avoiding the network 102 or the server 130. The confirmation confirms a successful installation of the set on the client 106 and initiates a connection listening service on the server 104 to listen for a connection from the client 106, as provided via the set. The server 104 can store the confirmation in a storage, as described herein. In the storage, the confirmation can be associated with a particular client, user input, applicant, application, or others.

In a block 506, during, such as in real-time, or after the client 106 receives a user input, such as an application from an applicant, the server 104 receives client device data from the client 106 over the network 102 through the server 130 or directly, while avoiding the network 102 or the server 130. The client device data comprises an aspect, a characteristic, a property, or a feature of the input device or the output device of the client 106, as monitored via the set. The server 104 can store the client device data in a storage, as described herein. In the storage, the client device data can be associated with a particular client, user input, applicant, application, confirmation, or others.

In a block 508, the server 104 accesses the client device data in the storage, sends the client device data to the server 128, and requests the server 128 to process the client device data, such as via analytics, which can include other processing, as disclosed herein. Alternatively, the server 104 accesses the client device data in the storage and processes the client device data, as described herein. Therefore, not only can user data analyzed, but user client device interactions can be analyzed as well.

In a block 510, the server 104 outputs a message based on processing of the client device data. The output can be of any type, such as symbolic, alphanumeric, video, audio, tactile, or any other type. The message is informative of the block 510. Note that any server of the topology 100 can act upon such message. For example, the message can inform a data analyst that when the applicant is prompted to edit the application based on querying the 3rd party service, the applicant hesitated, changed several other answers, and moved his mouse frantically, which can indicate panic or fear and therefore potentially indicate an error or a misrepresentation.

Figure 6:
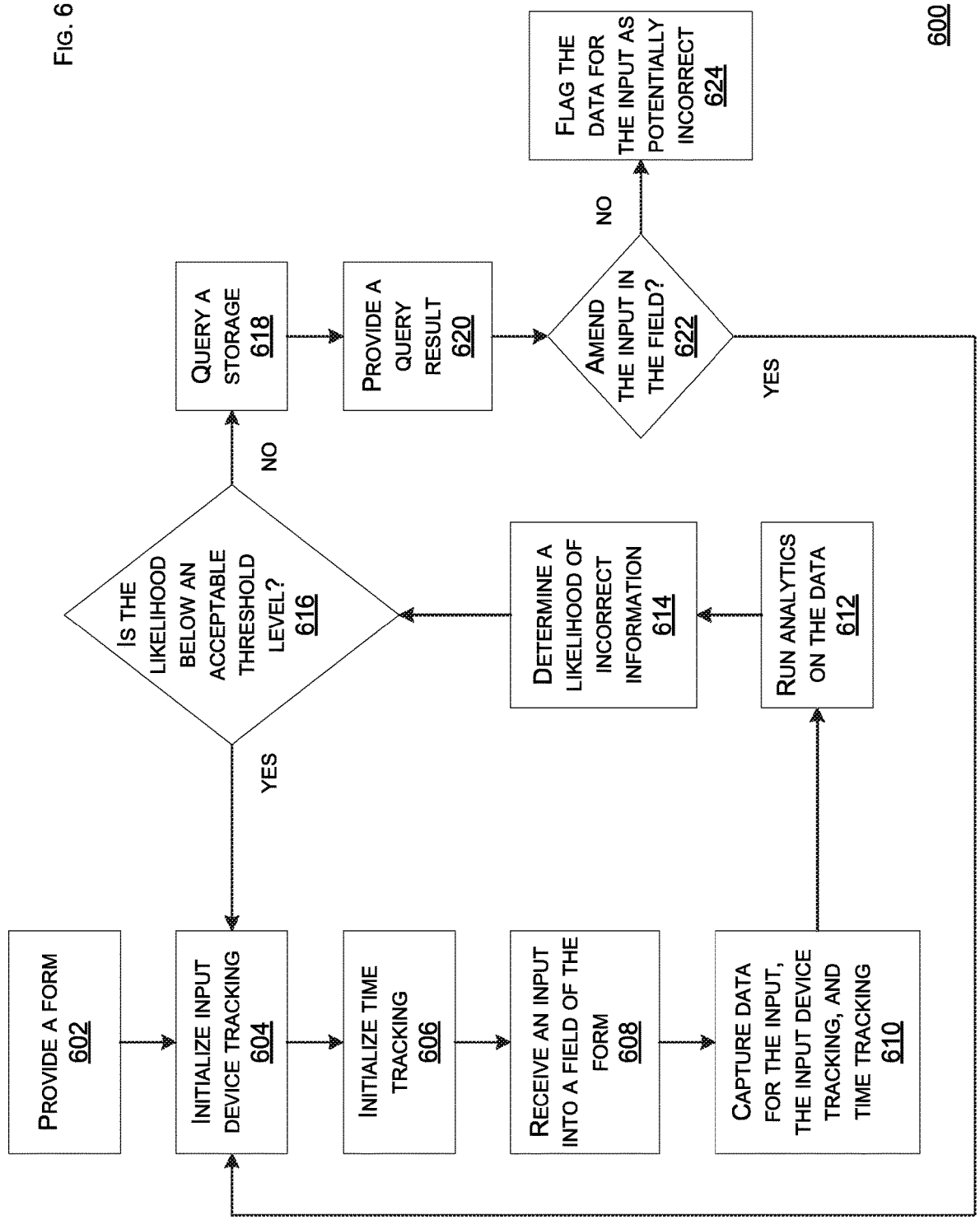
FIG. 6 shows a flowchart of an example embodiment of a process for misrepresentation detection, in accordance to an embodiment of the present disclosure.

FIG. 6 shows a flowchart of an example embodiment of a process for misrepresentation/fraud detection according to the present disclosure. A process 600 includes a plurality of blocks 602-610. The process 600 is at least partially performed using the topology 100 of FIG. 1 and in context of the process 200, 300, 400, or 500.

In a block 602, the server 104 provides a form to the client 106 through the server 130 over the network 102 or directly, while avoiding the server 130 or the network 102. The form (e.g., a network page configured to display one or more input fields) is configured to receive a plurality of inputs from a user of the client 106. For example, the inputs can relate to application information, such as name, age, gender, race, address, family information, education information, credit score information, occupation, health information, financial information, potential risk information, or any other relevant information, such as personal or demographic information. The form can be a single page or a plurality of pages, whether a single display area or multiple display areas, which can be scrollable. The form can comprise or be substantially defined via one or more GUI control elements, which can be configured to be monitored, by the server 104 through the server 130 over the network 102 or directly, while avoiding the server 130 or the network 102, in real-time, based on the user of the client 106 interacting or operating the one or more GUI control elements. For example, one or more GUI control elements can comprise a widget, an accordion, an address bar, an adjustment handle, an alert dialog box, a breadcrumb, a button, a checkbox, a combo box, a context menu, a cycle button, a date picker, a dial, a dialog box, a disclosure widget, a drop-down list, a dropdown menu, an edit menu, a file dialog, a file menu, a frame, a grid view, a hamburger button, a hyperlink, an infobar, an inspector window, a label, a list box, a menu, a menu bar, a menu extra, a mouseover, a navigation bar, a notification area, a palette window, a panel, a pie menu, a pop-up notification, a popover, a progress bar, a radio button, a ribbon, a scrollbar, a search box, a sidebar, a slider, a software widget, a spinner, a splash screen, a status bar, a tab, a text box, a throbber, a toolbar, a tree view, a window, or any other element that can be monitored in real-time.

In a block 604, when executed, the set of computer-executable instructions of FIG. 5 initializes input or output device tracking on the client 106 upon detecting the form being populated or about to be populated on or via the client 106. In some embodiments, server 104 generates an instruction configured to activate a tracking device or a tracking module within the client's computing device. The server 104 may activate the tracking module/device upon transmission of the instruction. The tracking module/device, as described in FIG. 5, may track the activities by any device or module associated with the client computing device.

In a block 606, when executed, the set of computer-executable instructions of FIG. 5 initializes time tracking on the client 106 upon detecting the form being populated or about to be populated on or via the client 106. For example, the time tracking can track time a user spends on or between various GUI elements presented on the client 106, such as on a text field entry or between a first drop-down list and a second drop-down list. As explained above, the time tracking may be conducted by a tracking device or a tracking module associated with the client computing device. The tracking module/device may transmit a time value back to the server 104.

In a block 608, the server 104 receives an input into a field of the form. For example, the input can comprises personal, health, or financial information, or any other relevant information. The input can be based on any type of data, such as symbolic, alphanumeric, video, audio, tactile, or any other type. The server 104 stores the input in a storage, such as the storage 114 via the controller 112. Note that the field can be a text field, a control field, or any other GUI element.

In a block 610, the server 104 receives captured data from the set of computer-executable instructions of FIG. 5, when executed. The captured data comprises the input or output device tracking on the client 106 and time tracking on the client 106. The server 104 can receive the captured data serially or in parallel or in real-time. The server 104 stores the captured data in a storage, such as the storage 114 via the controller 112.

In a block 612, the server 104 sends a request to the server 128 to access the captured data in the storage and run analytics on such data as known to one of skilled in the art. The analytics can induce or determine various patterns or connections about the user. The server 128 stores the analyzed data in a storage, such as the storage 114 via the controller 112. As explained above, the server 104 may compare the received inputs from the client computing device with the first model (e.g., ground truth model).

In a block 614, the server 104 accesses the storage storing the analyzed data and, using at least various processes disclosed herein, determines a likelihood of incorrect information based on the analyzed data from the ground truth model.

In a block 616, the server 104 accesses an acceptable threshold level in the storage storing the analyzed data and determines if the likelihood of incorrect information is below the acceptable threshold level. The acceptable threshold level comprises a value, a flag, or a variable input or set via the terminal 126 and sent to the server 104. The server 104 receives the acceptable threshold level and stores the acceptable threshold level in the storage 110 such that the acceptable threshold level is related to or associated with a particular user session. The acceptable threshold level can be reset. For example, the terminal 126 can receive a manager input corresponding to the acceptable threshold level, where the manager input can be 95%, which can be indicative of the likelihood of incorrect information being 5%. If the likelihood of incorrect information is below the acceptable threshold level, then the block 604 is performed for a next field, a next data point, a next application, or a next user. If the likelihood of incorrect information is not below the acceptable threshold level, then a block 618 is performed.

In a block 618, the server 104 queries a storage, whether a 3rd party storage or non-3rd party storage. For example, the server 104, through the server 130 and the network 102, queries the server 116. Alternatively, the server 104 queries the server 116 while avoiding the server 130 or the network 102. The query contains information related to or obtained from or contained in the input of the block 608. The query can be about the user identified in the input. The server 116 can include, be a part of, or is a social network service, a pharmaceutical service, a medical service, an educational service, a financial service, an employment service, a governmental service, or any other relevant service. The server 116 requests data from the storage 120 via the controller 118 and sends the data retrieved from the storage 120 to the server 104 through the network 102 and the server 130 or directly while avoiding the network 102 or the server 130. Note that the block 618 can be performed even if the likelihood is below the acceptable threshold level of the block 616.

In a block 620, the server 104 provides the query result to the client 106 based on the query. The user operates the client 106. The server 104 receives the queried data from the server 116 and prompts the client 106, through the server 130 over the network 102, based on the queried data. The prompt can be informative of or inquiring the user of a potential misrepresentation or an error in the application or in the result of the application of the application to the second model.

In a block 622, the server 104 inquires if the user wants to amend or edit the input in the field. The user operating the client 106 is prompted as to whether the user wants to submit amend or edit the input in the field. Such inquiry is performed via the server 104 sending a message through the server 130 over the network 102 to the client 106, where the message asks if the user wants to amend or edit the input in the field. If the user indicates a desire to amend or edit the input in the field, such via operating the GUI on the client 106, then the block 604 is performed. If the user indicates a desire not to amend or edit the input in the field, then a block 624 is performed. Note that the client 106 can be monitored during the block 622, such as to monitor an input device or an output device of the client 106, as described herein, for instance in FIG. 5. Such monitoring can aid in a heuristic pattern recognition, which can reduce fraud or errors in the input. For example, the heuristic pattern recognition can be based on a Bayesian approach to detect a misrepresentation or an error in the input. In some embodiments, if the user indicates a desire to amend or edit the input in the field, then the second model (e.g., fraud detection model) is updated with the information. For example, if the client indicates that an answer is to be modified, the server 104 will automatically update the second model to include data pertinent to the client answering said answer (e.g., content of the answer, and the data gathered as a result of computer tracking such as how long it took the client to answer said question from the form).

In a block 624, the server 104 flags the input or the captured data as potentially incorrect. Note that the input can be flagged by the server 104, even if the user amends or edits the application. Such flag is stored in the storage 114 via the controller 112 by the server 104 and related to the input. The flag can be helpful for further review or a direction of the user to an appropriate channel, such as an agent for a personal interview.

FIG. 7 shows a graphical user interface page configured to receive a user input according to the present disclosure. A graphical user interface page 700 comprises a plurality of visual elements 702-706. The page 700 is presented on the client 106, whether generated via the server 104 and provided to the client 106, as disclosed herein, such as over the network 102, or generated via the client 106 and populated via the server 104, as disclosed herein, such as over the network 102. The server 104 tracks or monitors usage of the page 700. Alternatively, the set of computer-executable instructions of FIG. 5, when executed, track or monitor usage of the page 700 and send such tracking or monitoring information to the server 104, such as from the client 106 over the network 102 through the server 130, to the server 104.

The element 702 is a text box, which is programmed to receive a user input, such as an account number. The input can be symbolic, alphanumeric, or any other type. Any use or interaction with the element 702 can be tracked or monitored via the server 104. Alternatively, any use or interaction with the element 702 can be tracked or monitored via the set of computer-executable instructions of FIG. 5 when executed on the client 106.

The element 704 is a drop-down menu box, which has been selected for Item B. The element 704 is programmed to receive a user input, such as a gender. Any use or interaction with the element 704 can be tracked or monitored via the server 104. Alternatively, any use or interaction with the element 704 can be tracked or monitored via the set of computer-executable instructions of FIG. 5 when executed on the client 106.

The element 706 is a drop-down menu box, which is being selected between Item A, Item B, and Item C. The element 706 is programmed to receive a user input, such as an occupation. Any use or interaction with the element 706 can be tracked or monitored via the server 104. Alternatively, any use or interaction with the element 706 can be tracked or monitored via the set of computer-executable instructions of FIG. 5 when executed on the client 106.

In one method of operation, the page 700 is tracked during the blocks 212-214 of the process 200 or the blocks 430, 434, 436 of the process 400 or the block 506 of the process 500 or the blocks 602-610, 616, 620, 622 of the process 600.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method comprising:

generating, by a server, a first network page comprising a plurality of input fields configured to receive a plurality of inputs;

generating, by the server, a first instruction to real-time monitor an input device associated with a client computing device, wherein the input device is at least one of a keyboard device or a cursor device;

upon transmitting the first network page and the first instruction to the client computing device, receiving, by the server, the inputs from the client computing device and a set of first data from the client computing device, wherein the set of first data is sourced from real-time monitoring of the input device based on the first instruction being executed on the client computing device when the inputs are generated via the input device, wherein the set of first data is machine-generated based on the first instruction;

determining, by the server, a client attribute associated with the inputs;

determining, by the server, a likelihood of fraud value based on a fraud detection model, wherein the fraud detection model comprises a set of second data received from a first database for user records with at least one client attribute that is same as the client attribute and corresponding user inputs to same input fields, and the set of first data sourced from real-time monitoring of the input device based on the first instruction being executed on the client computing device when the inputs are generated via the input device, wherein the server identifies the likelihood of fraud value based at least on one of the set of second data received from the first database, corresponding user inputs to same input fields, or the set of first data sourced from real-time monitoring of the input device based on the first instruction being executed on the client computing device when the inputs are generated via the input device;

in response to the likelihood of fraud value satisfying a threshold, generating, by the server, a second instruction configured to receive an electronic profile associated with the client computing device;

upon transmitting the second instruction to a second database, receiving, by the server, the electronic profile associated with the client computing device from the second database;

generating, by the server, a second network page configured to display the electronic profile associated with the client computing device and a notification inquiring whether the client computing device is willing to modify any of the inputs corresponding to the input fields within the first network page, wherein the notification is based on the set of first data sourced from real-time monitoring of the input device based on the first instruction being executed on the client computing device when the inputs are generated via the input device, the second network page comprising at least one client attribute known to the server to be accurate and further to be inconsistent with at least one input received from the client computing device;

transmitting, by the server, the second network page to the client computing device; and in response to receiving an input consistent with the inputs, transmitting, by the server, a fraud value to the first database.

2. The method of claim 1, wherein the notification is a first notification, and further comprising:

generating, by the server, a second notification comprising an invitation for a different channel of communication; and transmitting, by the server, the second notification to the client computing device.

3. The method of claim 2, wherein the channel of communication comprises at least one of a telephone call or an in-person meeting.

4. The method of claim 1, wherein the input device associated with the client computing device is the keyboard device.

5. The method of claim 1, wherein the input device associated with the client computing device is the cursor device inclusive of a mouse.

6. The method of claim 1, wherein real-time monitoring of the input device associated with the client computing device comprises real-time monitoring a time value associated with the client computing device responding to each of the input fields within the first network page.

7. The method of claim 1, wherein the electronic profile associated with the client computing device is a social networking profile associated with the client computing device.

8. The method of claim 1, wherein the electronic profile associated with the client computing device is a pharmaceutical profile associated with the client computing device.

9. The method of claim 1, wherein the electronic profile associated with the client computing device is a medical profile associated with the client computing device.

10. The method of claim 1, wherein the input fields comprise a drop-down list, wherein the cursor device is real-time monitored during an interaction with the drop-down list.

11. A computer system comprising:

a server including a processor and a memory, wherein the processor is coupled to the memory, wherein the memory stores a set of instructions that are executable by the processor such that the processor is configured to:

generate a first network page comprising a plurality of input fields configured to receive a plurality of inputs;

generate a first instruction to real-time monitor an input device associated with a client computing device, wherein the input device is at least one of a keyboard device or a cursor device;

upon transmitting the first network page and the first instruction to the client computing device, receive the inputs from the client computing device and a set of first data from the client computing device, wherein the set of first data is sourced from real-time monitoring of the input device based on the first instruction being executed on the client computing device when the inputs are generated via the input device, wherein the set of first data is machine-generated based on the first instruction;

determine a client attribute associated with the inputs;

determine a likelihood of fraud value based on a fraud detection model, wherein the fraud detection model comprises a set of second data received from a first database for user records with at least one client attribute that is same as the client attribute and corresponding user inputs to same input fields, and the set of first data sourced from real-time monitoring of the input device based on the first instruction being executed on the client computing device when the inputs are generated via the input device, wherein the server identifies the likelihood of fraud value based at least on one of the set of second data from the first database, corresponding user inputs to same input fields, and the set of first data sourced from real-time monitoring of the input device based on the first instruction being executed on the client computing device when the inputs are generated via the input device;

in response to the likelihood of fraud value satisfying a threshold, generate a second instruction configured to receive an electronic profile associated with the client computing device;

upon transmitting the second instruction to a second database, receive the electronic profile associated with the client computing device from the second database;

generate a second network page configured to display the electronic profile associated with the client computing device and a notification inquiring whether the client computing device is willing to modify any of the inputs corresponding to the input fields within the first network page, the second network page comprising at least one client attribute known to the server to be accurate and further to be inconsistent with at least one input received from the client computing device;

transmit the second network page to the client computing device; and in response to receiving an input consistent with the inputs, transmit a fraud value to the first database.

12. The computer system of claim 11, wherein the notification is a first notification, wherein the set of instructions are executable by the processor such that the processor is further configured to:

generate a second notification comprising an invitation for a different channel of communication; and transmit the second notification to the client computing device.

13. The computer system of claim 12, wherein the channel of communication comprises at least one of a telephone call or an in-person meeting.

14. The computer system of claim 11, wherein the input device associated with the client computing device is the keyboard device.

15. The computer system of claim 11, wherein the input device associated with the client computing device is the cursor device inclusive of a mouse.

16. The computer system of claim 11, wherein real-time monitoring of the input device associated with the client computing device comprises real-time monitoring of a time value associated with the client computing device responding to each of the input fields within the first network page.

17. The computer system of claim 11, wherein the electronic profile associated with the client computing device is a social networking profile associated with the client computing device.

18. The computer system of claim 11, wherein the electronic profile associated with the client computing device is a pharmaceutical profile associated with the client computing device.

19. The computer system of claim 11, wherein the electronic profile associated with the client computing device is a medical profile associated with the client computing device.

20. The computer system of claim 11, wherein the input fields comprises a drop-down list, wherein the cursor device is real-time monitored during an interaction with the drop-down list.

* * * * *